Patented June 12, 1934

1,962,277

UNITED STATES PATENT OFFICE 1,962,277

BASIC NITRODERIVATIVES OF 9-AMINO-ACRIDINES AND PROCESS FOR PREPARING THE SAME

Heinrich Jensch, Frankfort-on-the-Main-Hochst, and Otto Eisleb, Hofheim-in-Taunus, Germany, assignors to Winthrop Chemical Company, Inc., New York, N. Y., a corporation of New York No Drawing. Application August 27, 1930, Serial No. 478,300. In Germany January 11, 1927

5 Claims. (Cl. 260—36)

Our present invention relates to basic nitro-derivatives of 9-aminoacridine and process for preparing the same.

We have found that all of the hitherto known organic compounds which are to be used for chemotherapeutic purposes are surpassed as regards their bactericidal efficacy by new acridine derivatives which are nitro-9-amino-acridine derivatives substituted in the amino group by any substituent containing at least one tertiary basic N-atom. More specifically, these new compounds correspond to the general formula:

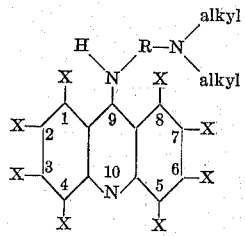

wherein R stands for an alkylene or hydroxy-alkylene group or for the group: —Y—NH—Z—, Y being an arylene group or an aliphatic acyl radical and Z being an alkylene, hydroxyalkylene or alkylene-amino-hydroxyalkylene group, and wherein at least one X stands for a nitro group, at least one of the other X's stands for a substituent of the group consisting of hydrogen, halogen, amino, alkyl and alkoxy, another X stands for hydrogen or alkyl and the remaining X's stand for hydrogen.

The said new compounds are obtained by subjecting nitro-9-halogenacridines with such primary bases as contain in addition at least one tertiary basic nitrogen atom, or by causing nitro-9-halogenacridines to act upon amino-carboxylic acids, or their esters or nitriles, and then transforming the nitro-acridyl-amino compounds thus obtained by one of the usual methods into basic acid amides by means of primary or secondary amines containing, in addition, at least one tertiary basic N-atom. The basic nitro-acridines in question may also be obtained by using, instead of the nitro-9-halogenacridines, the corresponding nitro-9-alkoxyacridines or nitro-9-aryloxyacridines or by effecting the reaction with the nitro-9-alkoxyacridines or nitro-9-aryloxy-acridines which are obtained as intermediate products. The reaction takes place in all cases, in presence or also in absence of a solvent.

The following examples illustrate our invention, but they are not intended to limit it thereto, the parts being by weight:

1. 2-ethoxy-6-nitro-9($\beta$-diethylaminoethylamino) acridine.

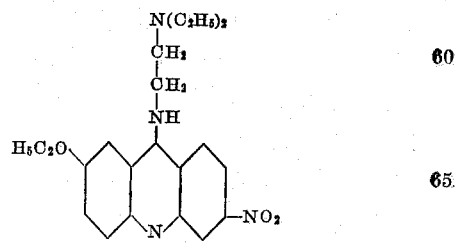

A solution of 6 parts of 2-ethoxy-6-nitro-9-chlor-acridine in 25 parts of phenol is heated on the water bath without separating the 9-phenyl-ether-hydrochloride produced thereby, and there are added thereto, while stirring, 2.3 parts of as-diethyl-ethylene-diamine. After having continued the heating operation for about one hour, the melt is allowed to cool and introduced into an excess of double-normal caustic soda solution; the base which solidifies on stirring for a short time is filtered by suction, washed with water, dissolved in acetone while being still in a moist state and the acetone solution is acidified with hydrochloric acid. Thus the red dihydrochloride is obtained which contains 3 molecular proportions of water and when recrystallized from alcohol melts at 245° C. to 246° C. with decomposition. It readily dissolves in water to a reddish-yellow solution from which it is salted out by the addition of common salt.

2. 2-ethoxy-6-nitro-9($\gamma$-diethylamino - $\beta$ - hydroxypropylamino) acridine.

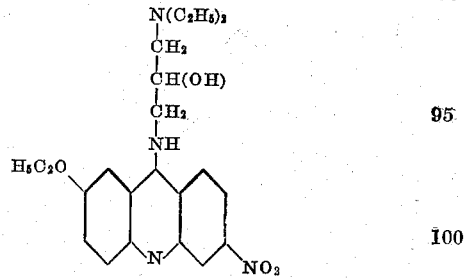

A solution of 6 parts of 2-ethoxy-6-nitro-9-chlor-acridine in 25 parts of phenol is caused to act in the manner indicated in Example 1 upon 3 parts of $\gamma$-diethylamino-$\beta$ hydroxypropylamine (cf. U. S. patent application Ser. No. 209,177 filed July 28, 1927). After cooling the melt is introduced in double-normal caustic soda solution. The base which is thus obtained at first as a resin, on stirring for a short time, however, in a solid state is dissolved in warm dilute acetic acid and re-precipitated after filtering by means of ammonia, so as to eliminate some nitroethoxy-acridone which has been formed during the reaction. On recrystallizing the product from dilute alcohol, it is obtained in the form of a red powder melting at 108° C., insoluble in water and readily soluble in acids to a reddish-yellow solution. It yields a dihydrochloride crystallizing with 5H₂O and melting at 226° C. to 227° C.

3. 2-ethoxy-6-nitro-9(para-β-diethylamino-ethylaminophenylamino) acridine.

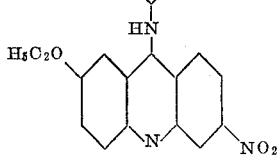

15 parts of 2-ethoxy-6-nitro-9-chloracridine dissolved in 60 parts of phenol are gradually added, while heating on the water bath and stirring, with 11 parts of N-diethyl-N'-para-amino-phenylethylenediamine (obtainable by the action of chlorethyldiethylamine upon para-nitraniline or para-aminoacetanilide and reduction or saponification, thick oil assuming a dark coloration when exposed to the air). The mass is further heated and stirred for one hour. After cooling the melt is diluted with acetone and acidified with alcoholic hydrochloric acid. Thus a dark-red hydrochloride is precipitated which is filtered by suction and washed with acetone. The salt is dissolved in water with the addition of animal charcoal and after filtering precipitated as a base by the addition of a sodium carbonate solution. The base forms when dried in a vacuum a dark-red powder which on recrystallization from aqueous acetone melts at 120° C. with decomposition. By dissolving the base in acetone and acidifying the solution with alcoholic hydrochloric acid the hydrochloride is obtained as a red powder which is readily soluble in water to a wine-red solution.

4. 2-ethoxy-6-nitro-9(para-γ-diethylamino-β-hydroxy-propylamino-phenylamino)-acridine.

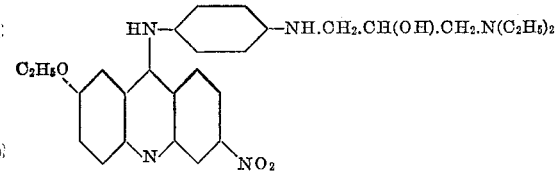

15 parts of 2-ethoxy-6-nitro-9-chloracridine dissolved in 60 parts of phenol are caused to act in the manner indicated in the preceding example upon 12 parts of 1-diethyl-amino-2-hydroxy-3-para-aminophenylaminopropane which is diluted with some alcohol. (The last named compound can be obtained by the addition of epichlorhydrine to para-amino-acetanilide, exchange of the chlorine atom for the diethylamino group and saponification of the acetyl group it is a thick oil boiling at 184° C. to 188° C. under 2.5 mm. pressure). The product of the reaction is worked up as indicated in Example 3. The dark red base melts after recrystallization from aqueous acetone at 131° C. to 132° C. The hydrochloride is readily soluble in water to a wine-red solution.

5. 2-ethoxy-6-nitro-9(para-γ-β'-diethylamino-ethylamino-β-hydroxypropylamino-phenyl-amino)-acridine.

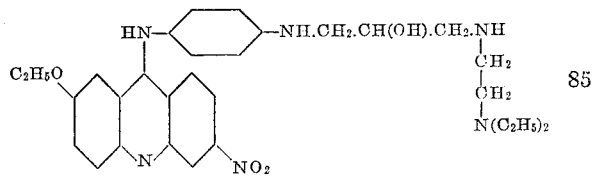

7 parts of 2-ethoxy-6-nitro-9-chloracridine dissolved in 30 parts of phenol are caused to act as indicated in the preceding example upon 6.4 parts of 1-β-diethyl-aminoethylamino-2-hydroxy-3-para-aminophenylaminopropane (obtainable by adding epichlorhydrine to para-aminoacetanilide, exchanging the chlorine for as-diethylethylenediamine and splitting off the acetyl group, being a thick oil boiling with slight decomposition at about 230° C. under 3 mm. pressure). The product of the reaction is worked up as above indicated. The base forms when dry an almost black powder melting when recrystallized from aqueous acetone at 86° C. The hydrochloride which can be prepared from the base in the manner indicated in Example 3, is a dark red powder dissolving in water to a wine-red solution. On the addition of hydrochloric acid its coloration changes to reddish-yellow.

6. 2-ethoxy-3.6-dinitro-9(para-β-diethyl-amino-ethoxy-phenylamino)-acridine.

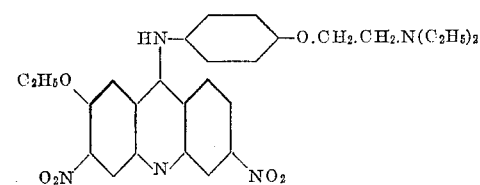

By heating 182 parts of 2-nitro-4-aminophenetol with 201 parts of 2-chlor-4-nitrobenzoic acid, 140 parts of potassium carbonate in 800 parts of amyl alcohol for 8 hours in a reflux apparatus, while adding a small quantity of Natur-kupfer C (a trade name for a very pure, finely divided form of copper), 5.5'-dinitro-4'-ethoxy-diphenyl-amine-2-carboxylic acid is obtained in the form of brownish crystals melting at 254° C. to 255° C. From the last named acid there may be prepared according to Ullmann's method by means of phosphorus pentachloride and aluminium chloride the 2-ethoxy-3.6-dinitroacridone and from this compound by the action of phosphorus pentachloride the 2-ethoxy-3.6-dinitro-9-chloracridine which forms thin yellow needles melting at 194° C. to 196° C. 35 parts of 2-ethoxy-3.6-dinitro-9-chloracridine, 21 parts of para-aminophenol-β-diethylaminoethylether and 100 parts of phenol are heated together, while stirring, to 120° C. and kept at this temperature for 30 minutes. After cooling the phenol is dissolved by treating the mass with an excess of dilute caustic soda solution, and the base of the new compound is obtained in the form of a reddish-brown powder which is readily and completely soluble in dilute acetic acid contrary to the acridine compound used as starting material. The base is purified by recrystallizing it from methyl alcohol. It is a reddish-brown crystalline powder melting at 155° C. The hydrochloride is obtained as a dark violet-red crystalline powder by adding to the base dissolved in acetic ester an alcoholic hydrochloric acid until there is just an acid reaction towards litmus. It is rather readily soluble in water. More concentrated solutions prepared in warm water gelatinize on cooling.

7. 2-methoxy-6-nitro- 9(γ-dimethylamino - β-hydroxypropylamino)-acridine.

14.5 parts of 2-methoxy-6-nitro-9-chloracridine, which melts at 217° C. to 218° C. and is prepared in an analogous manner as the ethoxy compound, are dissolved in 60 parts of phenol, while heating on the water bath and after addition of 6 parts of γ-dimethylamino-β-hydroxypropylamine (cf. Example 3 of U. S. patent application Ser. No. 208,060 filed on July 23, 1927) and the whole is further heated for 1 hour, while stirring. The melt is then poured into double-normal caustic soda solution and the new base separates in a solid form constituting 2-methoxy-6 -nitro - (γ- dimethylamino - β - hydroxypropylamino)-acridine. It is filtered by suction, dissolved in warm dilute acetic acid, this solution is filtered so as to become clear and the base is reprecipitated therefrom by the addition of ammonia. Recrystallized from a large quantity of acetone the base forms dark-red thin crystals which when heated assume a darker coloration and melt at 181° C. On adding alcoholic hydrochloric acid to an alcoholic suspension of the base, the dihydrochloride is obtained in the form of a light red powder which readily dissolves in water to a yellowish-red solution.

8. 6-nitro-9(γ - dimethylamino-β-hydroxypropylamino)-acridine.

20.7 parts of 6-nitro-9-chloracridine are caused to react in the manner indicated in the preceding example in 80 parts of phenol with 9.5 parts of γ - dimethylamino-β-hydroxypropylamine. The product of the reaction is worked up as indicated in the said example. The new base thus obtained, 6 - nitro-9(γ-dimethylamino-β-hydroxypropylamino)-acridine which has a red appearance melts when recrystallized from alcohol at 198° C. Its hydrochloride is golden-yellow and readily soluble in water to a golden-yellow solution.

9. 2-ethoxy - 7 - nitro-9(β-diethylamino-β-hydroxypropylamino)-acridine.

15 parts of 2-ethoxy-7-nitro-9-chloracridine are caused to react in 60 parts of phenol with 7.3 parts of γ-diethylamino-β-hydroxypropylamine as above indicated. After 20 minutes the reaction is complete. The new base is 2-ethoxy-7-nitro -9(γ - diethylamino-β-oxypropylamino)-acridine. It has a red appearance and melts when recrystallized from acetone and a small quantity of water at 151° C. It contains 1 molecular proportion of water of crystallization. By adding alcoholic hydrochloric acid to its solution in acetone, the yellow dihydrochloride is precipitated which is readily soluble in water to an orange-red solution.

10. 2 - ethoxy - 6 - nitro-acridyl(9) glycine-β-diethylaminoethylamide.

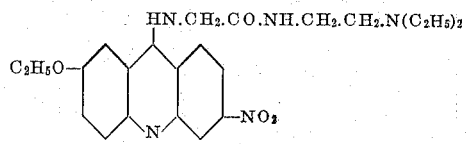

6.6 parts of 2-ethoxy-6-nitro-9-chloracridine are dissolved in 30 parts of phenol, while heating on the water bath, and there are added thereto drop by drop, while stirring, 3.8 parts of glycocolldiethylaminoethylamide in the course of an hour. After cooling the melt is poured into dilute caustic soda solution. After the base which precipitates in the form of a resin has been freed from the caustic soda solution, it is extracted by means of dilute acetic acid; this extract is filtered and ammonia is then added thereto. The new base, the 2-ethoxy-6-nitroacridyl (9) glycine-diethylaminoethylamide separates thereby as a gelatinous red mass which is transformed by heating into a yellow form to be easily filtered by suction and having the properties more particularly hereinafter described. The glycocolldiethylaminoethylamide necessary for the preparation of the 2-ethoxy-6-nitro-acridyl(9) glycine-diethylaminoethylamide is obtained by acylating as-diethylethylenediamine by means of chloracetylchloride and subsequently substituting the amino group for the chlorine by the action of ammonia. It is a strong base boiling at 135° C. to 137° C. under 4 mm. pressure.

The 2-ethoxy-6-nitroacridyl (9) glycinediethylaminoethylamide can, however, more advantageously be prepared in the following manner:

120 parts of 2-ethoxy-6-nitro-9-chloracridine are melted together with 360 parts of phenol, 32 parts of finely pulverized glycocoll are added thereto and the melt is heated for three hours on the water bath, while well stirring. Acetone is then added thereto, the hydrochloride of the 2 - ethoxy - 6 - nitroacridyl - 9 - glycine separated thereby is filtered by suction and washed with acetone. The product is soluble in an excess of dilute caustic soda solution to a clear red solution and insoluble in dilute sodium carbonate solution. It can be recrystallized from a mixture of glacial acetic acid and dilute hydrochloric acid and thus melts at 274° C. to 275° C. while foaming and assuming a darker coloration. From the solution of the product in caustic soda solution the free acid is precipitated by the addition of glacial acetic acid in the form of reddish-yellow flakes. From 2-ethoxy-6-nitro-9-phenoxyacridine the acid can be prepared as follows: 321 parts of the said compound (cf. Example 11) are dissolved in 1070 parts of phenol and after addition of 68 parts of glycocoll heated on the water bath for 5 hours, while well stirring. The melt then forms a compact red magma consisting of the 2-ethoxy-6-nitroacridyl-9-glycine which contains one molecular proportion of crystal phenol and melts at 225° C. while foaming. The magma is dissolved by adding thereto a hot mixture of alcohol and dilute hydrochloric acid. On cooling there is separated from this solution the hydrochloride of the acid free from phenol which is filtered by suction and washed with glacial acetic acid and benzol. 233 parts of the hydrochloride dried at 140° C. are treated in the ball mill for about 20 hours together with 900 parts of benzene and 180 parts of phosphorus pentachloride. By adding 25 parts of glacial acetic acid and further treating the product in the ball mill the excess of phosphorus pentachloride is destroyed, the resulting hydrochloride of the 2-ethoxy-6-nitroacridyl(9)-glycylchloride is filtered by suction and washed with benzene. It forms a yellowish-red loose powder melting at 217° C. to 218° C. with decomposition. 120 parts of the acid chloride are introduced, while very well stirring and cooling with ice water, into a mixture of 1000 parts of methyl alcohol and 40 parts of as-diethylethylenediamine and the resulting compact light-red magma is further stirred for about 1 hour. It is then poured, while stirring, into a mixture having a temperature between 70° C. and 80°

C. of 1500 parts of water and 80 parts of concentrated aqueous ammonia. Thus the new base, 2-ethoxy-6-nitroacridyl(9) glycine-β-diethylaminoethylamide, separates in a yellow form. It is filtered by suction, dissolved in warm, dilute hydrochloric acid, and the solution is filtered so as to become clear. On the addition of ammonia at ordinary temperature the base separates as a red gelatinous mass which is, however, transformed into the yellow form by heating. It can be recrystallized from acetone or methyl alcohol; it then contains two molecules of water of crystallization and melts at 153° C. while assuming a darker coloration. By adding alcoholic hydrochloric acid to the solution of the base in methyl alcohol, the dihydrochloride is obtained in the form of a red powder melting at 233° C. with decomposition. It crystallizes with 1½ molecules of water of crystallization, and is readily soluble in water to a yellowish-red solution.

11. 2-ethoxy-6-nitro-9 (γ-diethylamino-β-hydroxypropylamino) acridine.

5 parts of 2-ethoxy-6-nitro-9-phenoxyacridine are melted in the water bath together with 15 parts of phenol and 2.1 parts of 1-amino-3-diethylamino-2-propanol for 2 hours, while stirring. The melt is poured into an excess of dilute caustic soda solution, the base which separates is filtered by suction, dissolved in warm dilute acetic acid, freed by filtering from the nitroethoxyacridone which may have been formed and reprecipitated by means of ammonia. The base thus purified is identical with that described in Example 2. The 2-ethoxy-6-nitro-9-phenoxyacridine required for the reaction is obtained by melting in the water bath for a quarter of an hour 2-ethoxy-6-nitro-9-chloracridine together with about 1½ its weight of phenol and pouring the melt into an excess of double normal caustic soda solution. It is a yellow powder containing one molecule of water of crystallization and after recrystallization from acetone it melts at 166° C.

12. 2-ethoxy-6-nitro-9(γ-diethylamino-β-hydroxypropylamino) acridine.

6 parts of 6-nitro-2.9-diethoxyacridine are heated in a reflux apparatus for 2 hours together with 3 parts of 1-amino-3-diethylamino-2-propanol in 60 ccm. of amyl alcohol. The solution is then acidified with alcoholic hydrochloric acid and some ether is added thereto. The hydrochloride which separates thereby melts when recrystallized for several times from alcohol at 228° C. and proves to be identical with that described in Example 2. The 6-nitro-2.9-diethoxyacridine is obtained by boiling 2-ethoxy-6-nitro-9-chloracridine for a quarter of an hour with the calculated quantity of sodium dissolved in a large excess of alcohol and pouring the solution into water. The body forms when recrystallized from benzene thin golden-yellow laminæ melting at 177° C. to 178° C.

13. 2-ethoxy-6-nitro-9(γ-diethylamino-β-hydroxypropylamino) acridine.

6 parts of 6-nitro-2.9-diethoxyacridine are melted in the water bath with 3 parts of 1-amino-3-diethylamino-2-propanol and 25 parts of phenol for 3 hours, while stirring. The melt is worked up in the manner indicated in Example 11 and yields the product described in Example 2.

14. 2-ethoxy-6-nitro-9(γ-diethylamino-β-hydroxypropylamino)-acridine.

30 parts of 2-ethoxy-6-nitro-9-chloracridine are boiled for two hours in a reflux apparatus together with 14.5 parts of 1-amino-3-diethylamino-2-propanol in 300 ccm. of amyl alcohol. Thus the monohydrochloride of the base described in Example 2 is obtained. The product is transformed, advantageously by the addition of alcoholic hydrochloric acid, into the dihydrochloride which is then isolated in the manner indicated in the preceding example.

15. 1-methoxy-4-methyl-6-nitro-9(γ-diethylamino-β-hydroxypropylamino)-acridine.

By heating for 3 hours in a reflux apparatus 137 parts of 2-amino-4-methoxy-toluene, 201 parts of 2-chloro-4-nitrobenzoic acid, 140 parts of potassium carbonate and a very small quantity of copper with 300 parts of amyl alcohol, there is obtained 2'-methyl-5'-methoxy-5-nitro-diphenylamine-2-carboxylic acid in the form of brownish crystals melting at 210° C. By means of phosphorus pentachloride and aluminium chloride according to the method described by Ullmann the acridone is prepared which, when treated with phosphorus pentachloride, is transformed into 1-methoxy-4-methyl-6-nitro-9-chloracridine. It forms yellow crystals melting at 198° C.

2 parts of 1-methoxy-4-methyl-6-nitro-9-chloracridine, 4 parts of phenol, 1 part of 1-amino-3-diethylaminopropanol-2 are slowly heated to 125° C. while stirring and the whole is kept for 30 minutes at this temperature. After cooling 200 parts of acetone and 1 part of hydrochloric acid of 25 per cent strength are introduced. The precipitate, which is first greasy, but soon becomes solid on grinding, is filtered by suction, washed with acetone and purified by dissolving in methyl alcohol and reprecipitating the filtered solution with acetone. The substance is the dihydrochloride, it forms a brown crystalline powder being easily soluble in water. It decomposes at about 100° C.

16. 1.2-dimethoxy-4-methyl-6-nitro-9(γ-diethylamino-β-hydroxy-propylamino)-acridine.

By heating for 3 hours 167 parts of 3.4-dimethoxy-6-amino-toluene (obtained from 3.4-dimethoxy-6-nitro-toluene by reducing with hydrogen and palladium in an alcoholic solution, forming rectangular prisms melting at 108° C.), 201 parts of 2-chloro-4-nitrobenzoic acid, 140 parts of potassium carbonate, a small quantity of copper and 300 parts of amyl alcohol, 2'-methyl-4'.5'-dimethoxy-5-nitro-diphenylamine-2-carboxylic acid is obtained in the form of brown needles which, when recrystallized from glacial acetic acid, melt at 279° C.–280° C. while decomposing. It yields with phosphorus pentachloride and aluminium chloride, 1.2-dimethoxy-4-methyl-6-nitro-acridone, which, when treated with phosphorus pentachloride, is transformed into 1.2-dimethoxy-4-methyl-6-nitro-9-chloracridine, melting at 185° C.

33 parts of this chloracridine, 66 parts of phenol and 15 parts of 1-amino-3-diethylaminopropanol-2 are slowly heated to 125° C. while stirring and kept for 20 minutes at this temperature. The melt is poured in 400 parts of 2 normal caustic soda solution, whereby the base separates, which is first greasy, but soon solidifies on grinding. The transformation into the dihydrochloride is effected by dissolving the base in acetone and mixing with the quantity of hydrochloric acid calculated upon 2 equivalents. The salt forms a brown crystalline powder being easily soluble in water; the substance melts while decomposing; the melting point depends on the rapidity of heating and is at about 190° C.

17. 2-chloro-6-nitro-9(γ-diethylamino-β-hydroxypropylamino)-acridine.

By boiling for 8 hours 200 parts of 2-chloro-4- nitrobenzoic acid with 150 parts of potassium carbonate and 130 parts of para-chloraniline in 1000 parts of amyl alcohol in the presence of some copper, 3-nitro-4'-chloro-diphenylamine-6-carboxylic acid is obtained which, when recrystallized from glacial acetic acid, forms a red powder melting at 246° C.–247° C.

This acid is transformed according to Ullmann's method into the 2-9-dichloro-6-nitroacridine, which, after recrystallizing from chloroform and methyl alcohol, forms a yellow crystalline powder melting at 232° C.–233° C.

14.5 parts of 2-9-dichloro-6-nitroacridine are dissolved in 60 parts of melted phenol and 7.5 parts of γ-diethylamino-β-hydroxypropylamine are added thereto. The melt is then heated for 1 hour while stirring on the water bath and, after being cooled, poured into 2 normal caustic soda solution. Thereby the new base separates in the form of a red powder. By taking up in hot dilute hydrochloric acid, filtration of the solution and reprecipitation from the filtrate by means of ammonia, it is obtained in a pure form. When recrystallized from acetone, it forms a light red, crystalline powder, melting at 141° C.–142° C. Its yellowish-red dihydrochloride is easily soluble in water with a yellowish-red color.

This application contains subject matter in common with our co-pending application Ser. No. 245,045, filed January 6, 1928, and is to be regarded as a continuation-in-part of said application.

We claim:

1. The 1-methoxy-4-methyl-6-nitro-9-(γ-diethylamino-β-hydroxypropylamino)-acridine

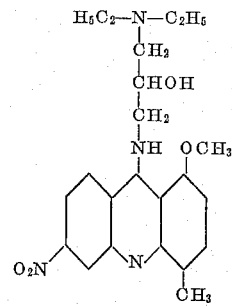

forming a brown crystallized hydrochloride, which is easily soluble in water and melts at about 100° C. with decomposition.

2. The 2-chloro-6-nitro-9-(γ-diethylamino-β-hydroxy-propylamino)-acridine:

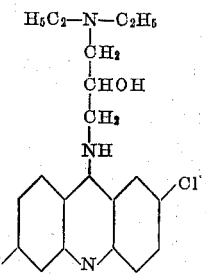

being a light red crystalline powder, melting at 141° C.–142° C. forming a yellowish-red dihydrochloride which is easily soluble in water with a yellowish-red color.

3. The process for preparing therapeutically active basic nitro-derivatives of 9-aminoacridine, which comprises causing compounds of the general formula:

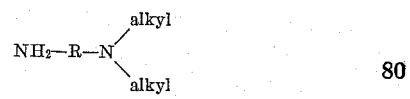

wherein R stands for an alkylene or hydroxyalkylene group or for the group:

Y being a phenylene group or an aliphatic acyl radical and Z an alkylene, hydroxyalkylene or alkylene-amino-hydroxyalkylene group, to act upon a nitro-acridine substituted in 9-position by halogen.

4. Nitro-9-aminoacridines of the following general formula:

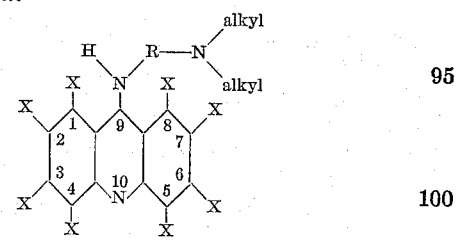

wherein R stands for an alkylene or hydroxyalkylene group or for the group

Y being a phenylene group or an aliphatic radical and Z being an alkylene, hydroxyalkylene or alkylene-amino-hydroxyalkylene group, and wherein one X stands for the nitro group and at most three other X's stand for one or two alkoxy groups and a substituent of the group consisting of halogen, amino and alkyl, the remaining X's being hydrogen, or two X's stand for nitro groups and at most two other X's stand for different substituents of the group consisting of halogen, amino, alkyl and alkoxy, the remaining X's being hydrogen.

5. Nitro-9-aminoacridines of the following general formula:

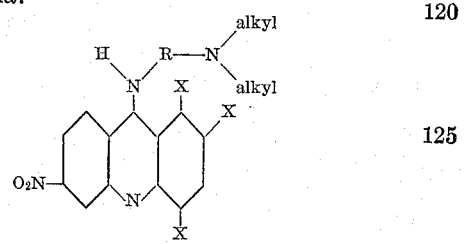

wherein R stands for an alkylene or hydroxyalkylene group or for the group

Y being a phenylene group or an aliphatic acid radical and Z an alkylene, hydroxyalkylene or ethyleneamino-beta-hydroxypropylene group, and wherein one X stands for methoxy or ethoxy, the remaining X's being hydrogen or one or two different substituents of the group consisting of halogen, amino and methyl, or two X's stand for methoxy or ethoxy and the remaining X stands for hydrogen or a substituent of the group consisting of halogen, amino and methyl.

HEINRICH JENSCH.
OTTO EISLEB.